United States Patent [19]

Bryant, Jr. et al.

[11] Patent Number: 5,572,949
[45] Date of Patent: Nov. 12, 1996

[54] EMERGENCY FEEDER FOR HERBIVOROUS WILDLIFE

[76] Inventors: Walter L. Bryant, Jr., 100 Perkins Ranch La.; Walter L. Bryant, Sr., 89 Perkins Ranch South, both of Columbiana, Ala. 35051-5007

[21] Appl. No.: 393,479

[22] Filed: Feb. 24, 1995

[51] Int. Cl.⁶ .................................................. A01K 5/00
[52] U.S. Cl. ................................................... 119/57.9
[58] Field of Search ............................. 119/57.91, 54, 119/53.5, 53, 52.2

[56] References Cited

U.S. PATENT DOCUMENTS

| | | | |
|---|---|---|---|
| 1,815,679 | 7/1931 | Ruth | 119/53.5 |
| 2,972,334 | 2/1961 | Braden | 119/54 |
| 3,034,480 | 5/1962 | French | 119/56 |
| 3,083,687 | 4/1963 | Slaven | 119/51 |
| 3,515,098 | 4/1968 | Thurmond | 119/51 |
| 3,638,617 | 1/1972 | White | 119/54 |
| 3,780,701 | 12/1973 | Wentworth, Sr. | 119/54 |
| 4,270,489 | 6/1981 | Joronen | 119/54 |
| 4,800,844 | 1/1989 | Van Gilst | 119/51.5 |
| 4,896,628 | 1/1990 | Kadunce | 119/52.2 |
| 4,945,859 | 8/1990 | Churchwell | 119/57.91 |
| 5,105,765 | 4/1992 | Loken | 119/52.3 |
| 5,195,460 | 3/1993 | Loken | 119/52.3 |
| 5,235,935 | 8/1993 | Edwards | 119/52.3 |
| 5,345,892 | 9/1994 | Kahn | 119/51.5 |

FOREIGN PATENT DOCUMENTS 2913511  10/1980  Germany .................................. 119/54

*Primary Examiner*—Gene Mancene
*Assistant Examiner*—Thomas Price

[57] ABSTRACT

This invention relates to a new and improved non-corrosive, vertically suspended, cylindrical shaped grain or feed dispensing device capable of concentrating its contents directly and immediately onto the ground without clogging for feeding all varieties of herbivorous wildlife within their own primitive habitat during unusual shortages of natural food caused by adverse weather or environmental conditions. It is of a geometric camouflage design. Its vertical length is sectional and adjustable. There are transparent sight areas along its length for checking the amount of food inside. It dispenses and maintains a constantly available supply of food directly upon the ground so that the weight of food inside is vertically supported by the ground. It has a manually adjustable feature which regulates the flow of food, and it has a spring-pump, anti-clogging feature which operates with the random forces of wind, animal, or by other forces which may be exerted upon it from time to time.

5 Claims, 4 Drawing Sheets

EMERGENCY FEEDER FOR HERBIVOROUS WILDLIFE

BACKGROUND OF THE INVENTION

This invention relates primarily to a means by which herbivorous wildlife may be fed temporarly during harsh winter months when natural foods within their own primitave habitats reach or approach starvation conditions.

The Emergency Feeder For Herbivorous Wildlife consists of a highly camouflage cylindrical shaped food dispensing device designed to be located primarily in the wild. Unlike other wildlife feeding devices, this invention is designed to concentrate food directly onto the ground for all varieties of herbivorous wildlife under emergency starvation conditions. This invention alluded primarily to a device consisting of non-corrosive materials, but it is not confined to that. Unlike other cylindrical feeder devices, the uniform cylindrical shape of this device is a necessary and vital embodiment of the design. The device is uniquely suspended vertically from two points, from a tree limb above or from another flexible structure in the wild, and it's base is anchored critically close to the ground below. In that position, the weight distribution of food within the device is supported by the ground, and it bears little weight upon the device or upon the structure from which the device is suspended. The contour of the entire length of this device is necessarily uniform in size and shape for enhanced camouflage purposes, and it is divided into identical, removable reservoir sections for height and volume adjustment. Its camouflage outer design contains transparent sight inspection areas along its length to inspect the level of food inside it. With the help of the random motions of wind, animals, or other forces which may be exerted upon the device from time to time, either horizontally (such as by an animal) or vertically (such as by the uplift of a swaying tree limb), an innovative spring-pump, anti-clog feature dispenses and maintains a consistent supply of loose flowing food at its base directly and immediately onto the ground. It has a manually operated, adjustable food valve which regulates the flow of food through the device. It can be easily refilled from the top. It can be shortened, or disassembled for cleaning or service without tools by removing or reinstalling the mechanical fasteners of the device which are all uniform and identical in design. The device is noise-free, requires no batteries, motors, or electrical devices. It is easily transported and installed by one person.

All prior non-electric, non-motorized feeder devices were derived from two basic concepts: One concept functions as an elevated feed container, hanged from one point, with an outlet and a trigger component (ie: wind propeller, lever arm, flexable hose, plug, plunger, etc.) located at the bottom of the container; so when the trigger component is activated in response to one of either wind force or animal utilization, fresh feed will dispense. This concept requires an elevated position above the ground or water to accommodate animal accessibility to the trigger component beneath the device, which facilitates broad scattering by the time the feed reaches the destination during the vending process, which is a problem for some advanced feed products containing fine grain mineral supplements. Seven of the fourteen references cited: Prior U.S. Pat. Nos. 4,945,859; 4,270,489; 3,780,701; 3,683,617; 3,515,098; 3,034,480; 2,913,511 are of this basic concept.

The other basic concept functions as a simple feed container which funnels and dispenses feed densely by means of gravitational force through an open outlet(s) located along or in the bottom of the container without a trigger component, directly onto either an affixed trough/tray component or onto the ground. Those utilizing or requiring a trough/tray component often required, or were intended for an elevated position hanged from one point above the device. The other seven reference cited, prior patent numbers: U.S. Pat. Nos. 3,083,687; 5,345,892; 5,235,935; 5,195,460; 5,105,765; 4,896,628 and 4,800,844 vary in design but are of this basic concept utilizing a trough/tray component.

No prior devices of his basic concept were discovered or cited that vends directly onto the ground since they are typically a one part contraption homemade of various tubular materials, are very simple, and have no moving parts. They require rigid attachments to a stationary object such as a pole or a tree trunk, and they are ideally suited for concentrating mineral supplements directly onto the ground and have other functional advantages over those of this same concept with a trough/tray component. Unfortunately, these simple devices which dispense feed contents directly onto the ground lend themselves to clogging. They are limited to, and require frequent active animal utilization to remove the old, exposed, and often unfresh feed to initiate new exposure of the fresh feed contained within. Otherwise, in the absence of frequent utilization activity, a small portion of feed exposed at the threshold of the outlet remains motionless and subjected to rot-causing conditions of nature such as moisture or fermentation, and insect nesting which causes solidification of the feed near the ground, and even more so if mineral supplements are included. Consequently, the remaining fresh feed within may become clogged at that point rendering the feeder device inoperable as most herbivorous animals by nature will avoid unfresh, rotten feed.

Past designs of feeders have favored the feeding of specific types of creatures only: domestic or wild; bird or animal. Most were created for domestic, non-wild settings. The few feeders which are created for the wild are not emergency feeders, but feeders for attracting specific wild animals or birds. They are more cumbersome to transport and do not dispense fine grained mineral additives well. They are not designed to blend well with the wild environment. Each has highly visible geometry, uncamouflaged in profile when positioned in a wild context regardless of finish; a pending problem in terms of theft and animal acceptance. They are more complicated and expensive in design, and they are less economical to manufacture or purchase. This invention fills the need to overcome those shortcomings.

U.S. Pat. Nos. 2,913,511, 2,972,334, 3,638,617, 4,945,859, 4,270,489, 3,515,098, 3,780,701 and 3,034,480, Feeders, are each vaguely similar in their functions and design. Except for U.S. Pat. No. 4,270,498 which clamps to an upright surface, they each hang freely elevated above the ground by a bail or by a rope. They are each cylindrical in shape. They each vend food from their bottoms scattering it broadly from above onto the ground or into the water below. They each are mechanically activated by either wind, animal, bird, or fish, via a trigger component to vend food, but they each are designed to feed a specific variety of wildlife only.

U.S. Pat. Nos. 5,195,460 and 5,105,765 Bird feeders, by Loken, can each hang by rope or bail from an overhead object of some sort. They are each cylindrical, they each give access to food mechanically, but they each are designed to feed birds only utilizing a trough/tray component above the ground.

U.S. Pat. Nos. 5,345,892, 5,235,935, 4,896,628, Feeders, are each elevated above the ground by rope or bail. They each are cylindrical in shape. They each have multiple feeding stations located vertically along their cylinder housings. Neither dispenses food from the bottom or onto the ground, and each are designed to feed birds only.

U.S. Pat. No. 4,800,844, "Dispensing Device For Food and Water", attaches to a wall near human habitat. It is primarily a continuous-feed inverted container over a tray, which meters out food onto the tray as food from the tray is eaten or removed. Its design restricts its use primarily to a sheltered environment for domesticated animals and birds, and to partially tame smaller wildlife.

U.S. Pat. Nos. 1,815,679 and 3,083,687 hangs from one point at the top of above the device and it is mainly cylindrical in shape. They dispense feed when a bird manipulates the tray at the bottom of the device, but they are designed to feed birds only and require an elevated position above the ground.

Historically, the feeding of wildlife within their own natural habitat during dangerous slack-food periods was confined technologically to feeding a specific variety of wildlife only, even if it was done at all. Deer, elk, and other wild creatures wander into urban areas in search of food when food becomes scarce within their own natural habitat. Prior to this invention, efforts to keep wildlife within their own environment during slack-food periods were not very successful. This invention is designed to enhance the chances for better results in the future.

ELEMENTS OF THE INVENTION

1. Tether
2. Bail or handle
3. Top cap
4. Feeder reservoir section
5. Joint insert
6. Pump spring
7. Base
8. Bottom disk
9. Hollow rivet
10. Anchor tether
11. Anchor
12. Mechanical fastener
13. Feed or food
14. Tree
15. Device reference numeral
16. Base aperture 1
17. Base aperture 2
18. Bottom disk aperture 1
19. Bottom disk aperture 2
20. Slot
21. Adjustment lever
22. Pump spring leg
23. Bottom disk rivet aperture
24. Rivet aperture
25. Site inspection area
26. Woodland finish
27. The ground (Earth)

SUMMARY OF THE INVENTION

Figure 1:
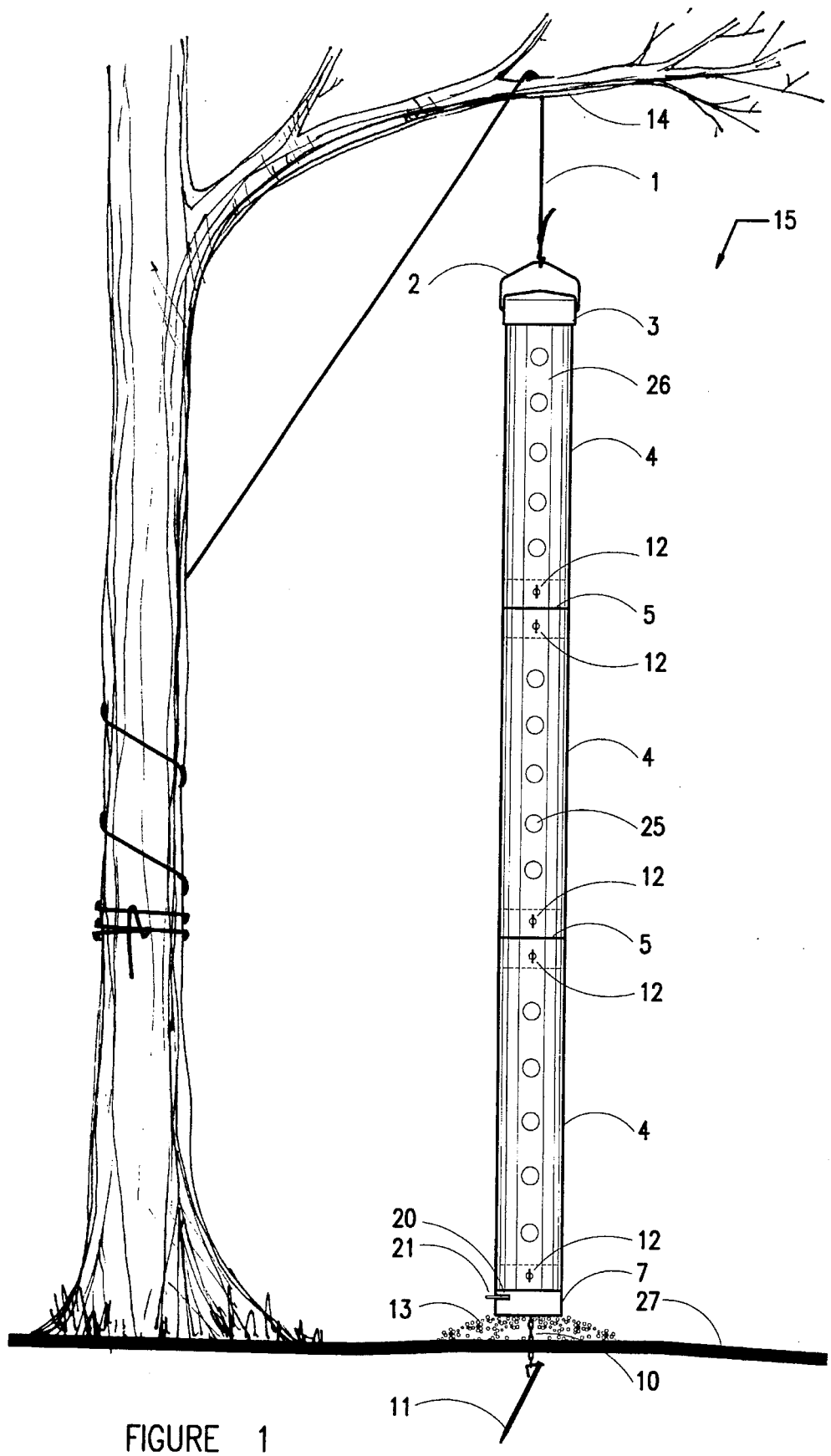
FIG. 1 is an elevation view of the new and improved emergency wildlife feeder shown suspended in the wild over the limb of a tree top and anchored into the ground at its base.

This application describes an emergency herbivorous wildlife feeder device which is of a unique concept. Unlike prior devices, it is necessarily positioned in the wild suspended vertically from two points by two secure tethers; one from a tree limb above (or something similar), and the other from the ground below. The top tether, like prior devices, elevates the device above but necessarily very close to the ground. The lower tether uniquely anchors the device from the ground and functions to transfer the resistive force generated from random external forces applied against the body of the device from the ground anchor onto a coiled pump-spring component incased within the base of the device. The pump-spring is a one-part component of a different structure and function than any prior device. It is of such configuration that feed flows between the coils enroute to the ground. The pump-spring is unique in that it remains unstressed and only becomes stressed to absorb tension when force is exerted onto the body, or any part of the device which responds accordingly by vertical expansion or compression within the vulnerable areas of the feed contents near the outlets. The pump-spring serves as an anti-clog feature which reacts constantly to any applied force from wind, animal, gravity or rain, generated from any direction and, therefore, facilitates frequent movement and looseness within the feed contents adjacent to the outlets to insure flowability and to prevent insect nests. Furthermore, as the coils are compressed together fresh feed is forced downward, cleaning the outlets enroute to exposure and alleviates the prior problem of animal avoidance by down-forcing the undesirable, unfresh feed aside.

The feed contents is concentrated and made more readily dispensable immediately and directly onto the ground below in the form of a dense conical shape mound; constantly accessible for all herbivorous animals. Due to the feeders close proximity to the ground, the ground surface actually supports the mound of exposed feed and the contained column of feed inside; bearing little weight on the device or the support. The ground surface also terminates the dispension flow process when the exposed mound of feed enlarges in volume creating a dam to terminate the vertical flow (a function of suspension height above the ground.) The dispension process uniquely resumes in response to either wind, rain, gravity or animal utilization, (or unlike prior devices, any combination thereof) when the exposed conical shaped mound of feed on the ground is altered to facilitate further flow, ie: when food is removed, when the lower portion of the device is moved laterally in any direction, when the tree limb sways vertically up-lifting and flexing the distance between the ground and the base of the feeder, or when spring pump component reacts to any force applied to the body of the device. Furthermore, unlike prior trigger actuated devices requiring an animals' intentional utilization efforts, the integrity of this device lends itself to be readily reactive to both intentional and incidental actions as animals unintentionally nudge the base of the device while consuming the readily exposed feed.

The Emergency Feeder For Herbivorous Wildlife of the present invention comprises a vertically extended uniform shaped camouflage non-corrosive tubular food reservoir having along its length transparent food inspection sites. It is sectional, and it can be lengthened or shortened by adding or removing sections of its length. A removable cap at the top gives access for loading, and an adjustable valve at the bottom meters the flow of food. The uniform shape and size of the device along with its close proximity to the ground allows the food within the device to support itself, solely by the ground through open apertures relieving stress from both the device and the structure from which it is suspended. It is of a geometric woodland, camouflage design for blending into a wild environment. In position its linear geometry extends from very near the ground to above normal peripheral vision and appears tree-trunk like. It is consistent in profile from all directions, thus geometrically camouflaged and therefore more appealing to wildlife and less subjected to thievery. It dispenses food directly upon the ground by the random motions of wind, animal, the force of gravity, or by any other forces which may be exerted upon it from time to time, which is desirable for concentrating fine grain mineral feed supplements densely onto the ground for saturation purposes.

The primary intent of the invention is to provide a more versatile non-motorized feeder which may be used during slack periods of scarce food in the wild for the humane emergency feeding of herbivorous wildlife within their own feeding habitat. Secondly, it may be used as a feeder for more domesticated creatures within a less harsh, more domestic setting.

The advantages and objects of this invention will be easier to see and understand from the enclosed Brief Description of the Drawings, the enclosed Detailed Description of the Drawings, and the background of the invention.

DETAILED DESCRIPTION OF THE DRAWINGS

In FIG. 1, the device 15 is illustrated in a natural and wild habitat, and it is assembled in its exterior form in three sections 4, each of which can be added or removed using mechanical fasteners 12 in order to adjust its length and its volume. It is anchored 11 close to and from the ground secured by tether 10 to an anti-clog component within the base 7, and the volume of food 13 upon the ground and within the device 15 is self-supporting, bearing no weight upon the device 15 or object 14 to which it is tethered 1.

In FIG. 1, the exterior objects of device 15 are shown and numbered as follows: Tether 1 is attached to bail 2 which in turn is attached to feeder reservoir section 4. Top cap 3 covers the shaft. Tether 1 is suspended over the limb of tree 14. Feeder reservoir sections 4 are joined together by transparent or non-transparent joint inserts 5, and secured with mechanical fasteners 12. Base 7 is attached at the bottom of feeder reservoir section 4, and it is secured with mechanical fasteners 12. The food valve lever 21, an integral part of bottom disk 8 (shown complete in FIGS. 2 and 8) extended through its slot 20 in base 7. Tether 10 is attached to pump-spring leg 22 (see FIGS. 2, 3 and 7) inside base 7, thence to anchor 11.

In FIGS. 1, the cosmetic exteriors of feeder reservoir sections 4 have a camouflage woodland design 26 with unfinished transparent sight inspection areas 25 along its length. Each exterior part is structurally uniform, interchangeable, and matches with the assembly points of all other exterior parts. In either its assembled or disassembled form the device is easily portable. It is noise-free, and it can be easily assembled, serviced or maintained without tools by one person.

Figure 2:
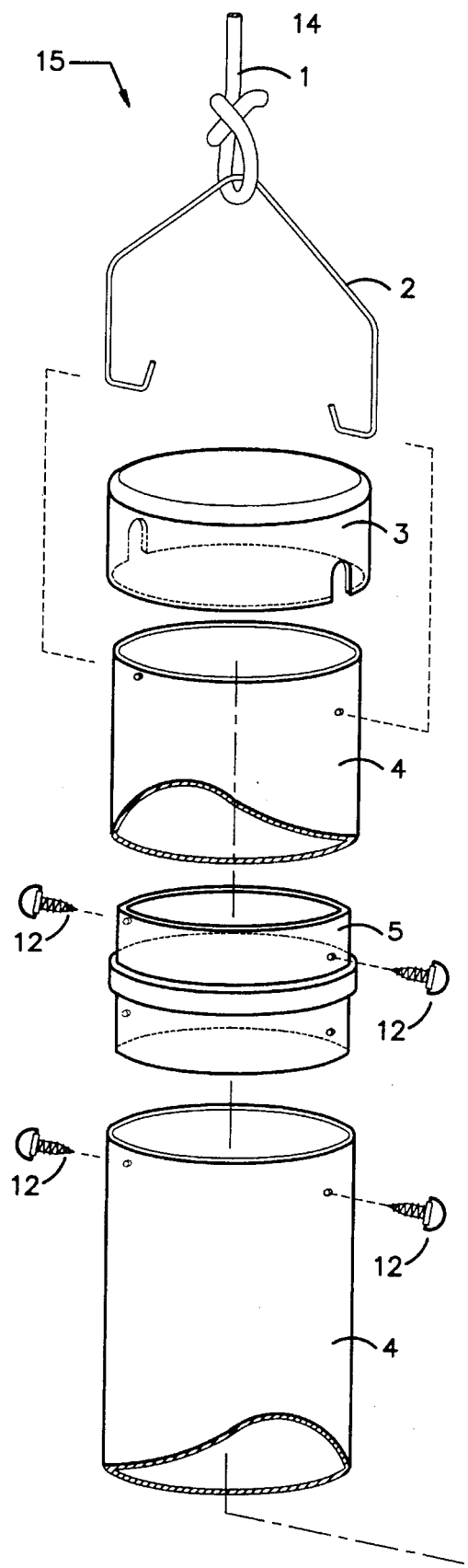
FIG. 2 is an exploded isometric view of the objects of the invention, and their relationship to each other.
Figure 2:
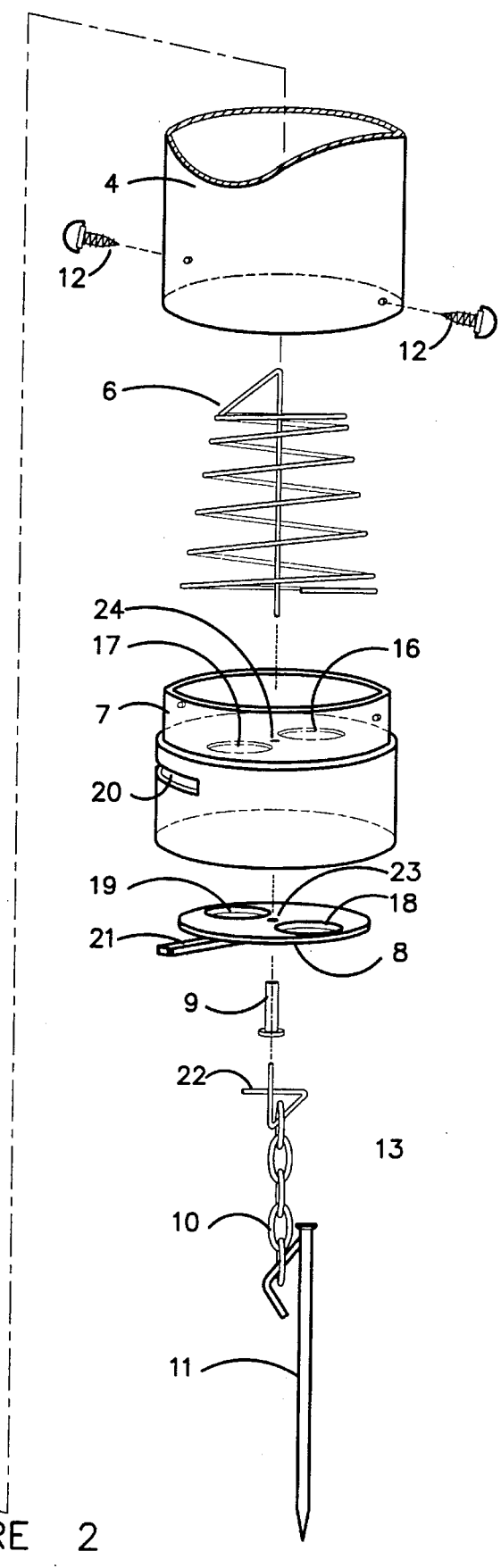

In FIG. 2, the design, shape and positions of the exterior objects shown assembled in FIG. 1 are in an exploded isometric view, showing an internal and external view of the various objects and their relationship to each other.

Tether 1, bail 2, top cap 3, feeder reservoir sections 4, anchor 11 were all sufficiently described previously in detailed descriptions of FIG. 1, and they need no further describing at this time.

In FIG. 2, base 7 is attached to feeder reservoir section 4 by inserting base 7 over, or into the bottom of feeder reservoir section 4, then securing them together with mechanical fasteners 12, or other appropriate devices not shown.

In FIG. 2, the design of base 7 is illustrated in a isometric exterior and interior view. A integral diametric surface is integrated within the base which contain two large apertures 16 and 17 on either side of its center, and a small rivet aperture 24 at the vertical center line. They are stationary within the base 7, and the apertures 16, 17 and 24 there match with similar apertures 18, 19 and 23 in bottom disk 8. The relative alignment or unalignment of the apertures of those two surfaces, along with the adjustment lever 21 on bottom disk 8 function as a valve, referred to hereafter as the adjustable feed valve.

In FIGS. 2, hollow rivet 9, or other suitable device secures bottom disk 8 to the bottom of its matching dismetric surface inside base 7. The center shaft of pump-spring leg 22 is positioned into the top of base 7 and through hollow rivet 9, and the larger diameter end of pump-spring 6 thus rests upon the top of the integral dismetric surface inside base 7. Thus positioned, the protruding end of pump-spring leg 22 is modified or bent in order to form a light pressure against hollow rivet 9 of the adjustment feed valve. With pump-spring leg 22 thus modified and resting under slight pressure against the bottom of hollow rivet 9, anchor tether 10 is attached to pump-spring leg 22 and anchor 11, and the entire device 15 is anchored slightly taunt and very close to the ground. Refer now to FIG. 1.

With device 15 properly anchored and secured, spring-pump 6 is free to flex and expand from any vertical or horizontal force, thus preventing clogging of food 13 and insuring that it is distributed freely and loosely upon the ground 27. It is the intent of the design that it be sufficiently secured in its anchored form so that it cannot easily be uprooted by any natural forces exerted upon it, and a functioning prototype of the design has proven that to be so. It is the primary assumption of the design that generally, motion will be caused mainly from the flow of wind, the nudge of an animal, or other natural force which may be exerted against the device from time to time.

Figure 3:
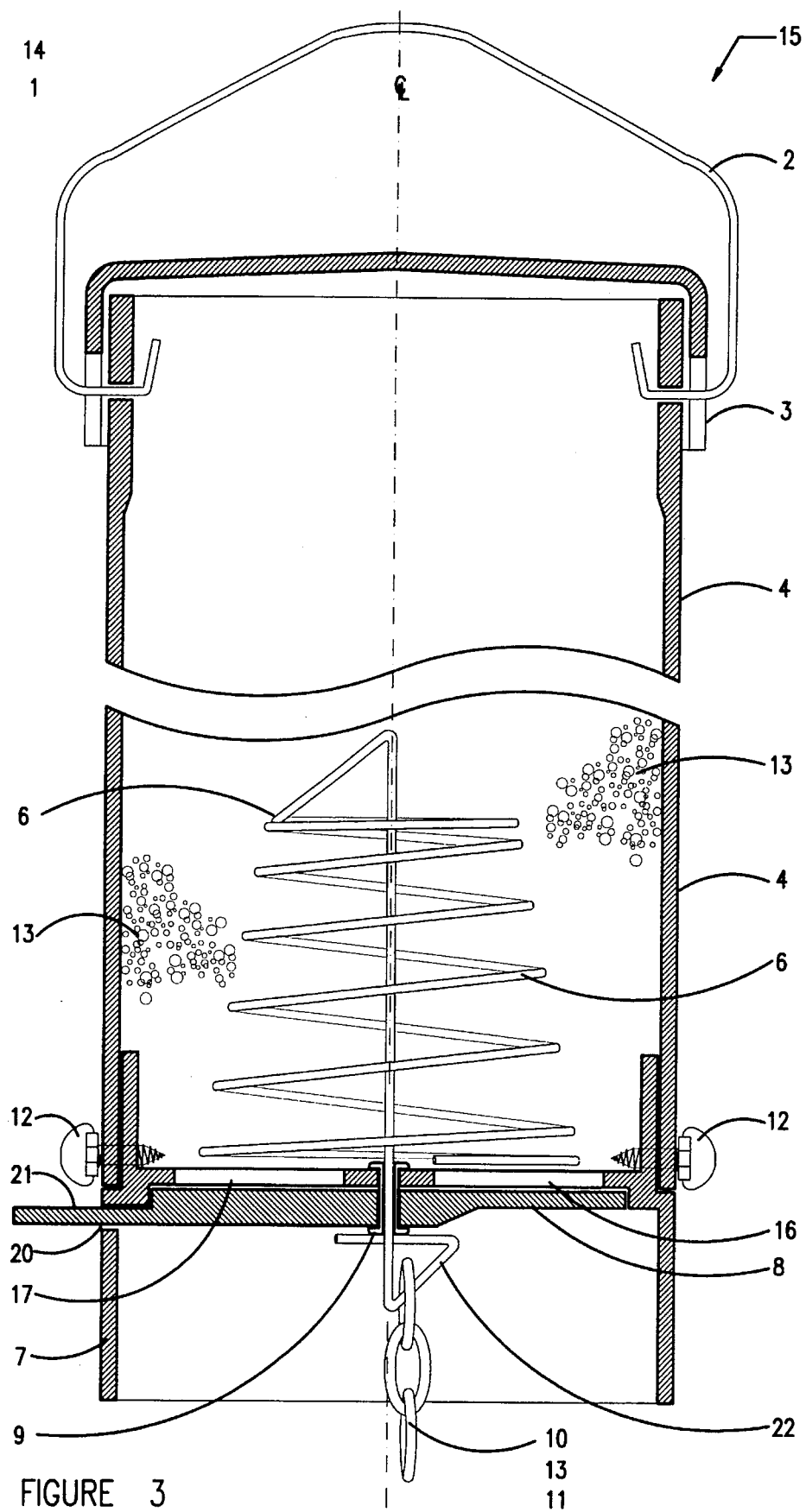
FIG. 3 is a partial section view of the feeder reservoir section with its primary internal and external parts in assembled position.

In FIG. 3, a partial section view of the device illustrates more clearly all objects of the invention there in place with the exceptions of tether 1, joint insert 5, tree 14, and anchor 11.

The upper part of FIG. 3 illustrates the top objects of device 15 which has been shown and described adequately in FIGS. 1 and 2.

The lower part of FIG. 3 illustrated the lower section of the device with all objects of the invention secured and in place with the exception of anchor 11. Base 7 shows a section view of the integral features of its design. Bottom disk 8 is secured against the bottom internal surface of base 7 by hollow rivet 9. Pump-spring 6 rests upon the top internal surface of base 7, and it is freely affixed therein by the modified or bent center shaft of pump-spring leg 22 and its position against the bottom of hollow rivet 9. Mechanical fasteners 12 secure feeder shark section 4 to base 7, and tether 10 attaches to the modified end of the center shaft of pump-spring leg 22 and onto anchor 11.

Figure 4:
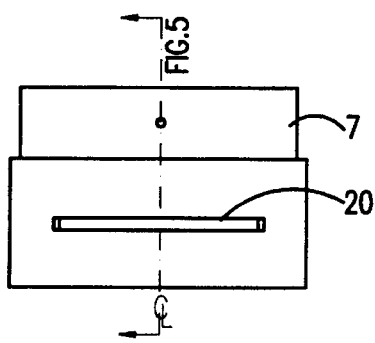
FIG. 4 is an elevation view of the base of the device showing mainly the feed valve arm adjustment slot.
Figure 5:
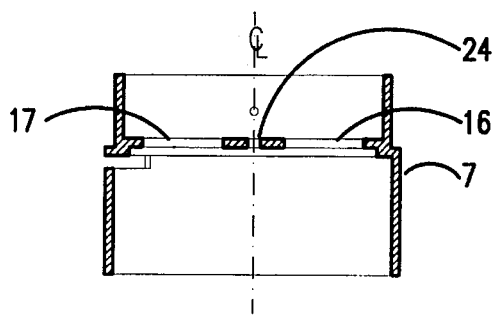
FIG. 5 is a section view of the base of the device showing an internal elevation view of the feed valve adjustment slot and a section view of the top half of the adjustable food valve which is an integral part of the base.
Figure 6:
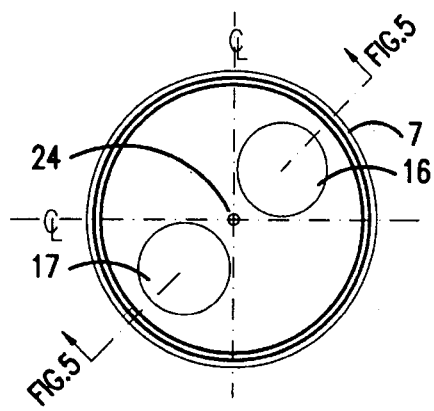
FIG. 6 is a top view of the base shown in FIGS. 4 and 5.

In FIGS. 4, 5 and 6, three different views of the base 7 are shown. FIG. 4 is an elevation view illustrating the slot 20 through which the feed valve adjustment lever 21 of bottom disk 8 is placed. FIG. 5 is a section view of base 7 which illustrates more clearly the integral placement of base apertures 16, 17 and rivet aperture 24 of the adjustable feed valve component. FIG. 6 is a top view of the same, clearly illustrating the base apertures 16 and 17 which work in conjunction with matching bottom disc apertures 18 and 19 in bottom disk 8 to form the adjustable feed valve. Illustrated also is the smaller rivet aperture 24 at the vertical center line through which hollow rivet 9 secures base 7 to bottom disk 8, and through which the shaft of pump spring leg 22 is threaded and secured against the bottom of hollow rivet 9.

Figure 7:
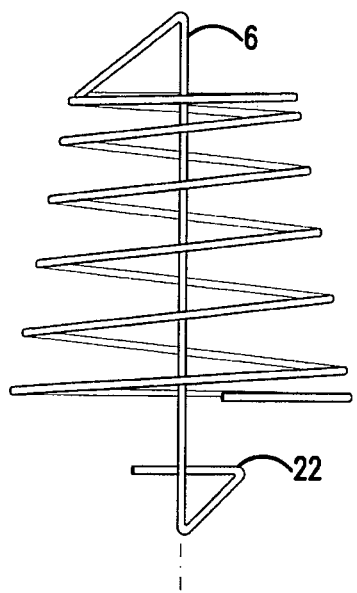
FIG. 7 is an elevated view of the spring which operates as a pump in the devices final assembly.

In FIG. 7 the lower end of the center shaft of pump-spring leg 22 is modified or bent as it finally appears as a working component of the device.

Figure 8:
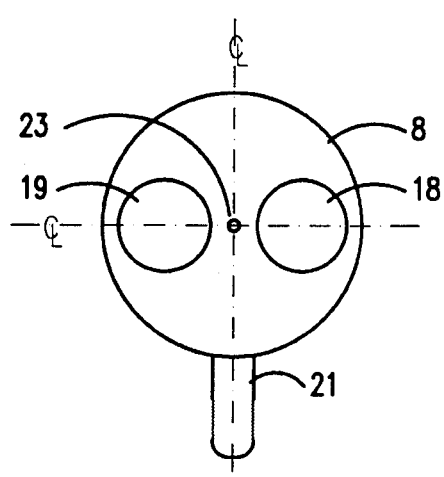
FIG. 8 is a top view of bottom disk showing an integrated adjustment lever and the apertures which function with those integrated within the base shown in FIGS. 4, 5, and 6, which together create a valve. The alignment of the two sets of apertures is adjusted by the lever on the bottom disk shown here, thereby increasing or decreasing the flow of food through the valve.

In FIG. 8, bottom of disk 8 is shown in a top view complete with feed valve adjustment lever 21, bottom disc apertures 18, 19, and bottom disc rivet aperture 23 as one solid movable part.

It is the intent of the design that all objects of the design be made of a non-corrosive material, but it is not the intent of the design that any of the objects be restricted to that type material only.

We claim:

1. A linear, vertically suspendable, non-corrosive wildlife feeder consisting of a vertically extended tubular feed reservoir of uniform exterior vertical contours in size and shape consistent and uninterrupted in profile by any other constructive features along its exterior length made up of two or more matching uniform interchangeable sections joined together internally with joint inserts and fastened together with removable mechanical fasteners; having a base component joined internally and mechanically fastened to the bottom of the lowest said reservoir section with feed outlet apertures and an incased loosely coiled anti-clog spring component positioned above and over the feed outlet apertures configured with a spring leg penetrating downward along the vertical center line of the feeder through said base component with a hooked bend at the bitter end with a tether attached linking to an anchor secured into the ground.

2. The feeder of claim 1, wherein the anti-clog spring component is housed within the base of the lowest feed reservoir section to facilitate looseness and maintain consistent distribution of feed directly and immediately onto the ground underneath said feeder in responses to random vertical or lateral forces generated against the body of the feeder by wind, gravity, animal, or by any other forces or combinations thereof which may come to bear from time to time.

3. The feeder of claim 1, wherein the linear device is suspended and secured from two points at opposite ends so as to harness natural forces applied to the body of the feeder device to work an anti-clog component for maintaining looseness and flowability of the feed contents.

4. The feeder of claim 1, the anti-clog spring component, wherein the mechanism is incased within the feed reservoir with a vertical leg protracting downward along the vertical centerline of the feeder and penetrating through a small aperture in the diametric center of the base component with a hooked or looped bend for tether attachment at its bitter end.

5. The feeder of claim 1, wherein food is distributed immediately and directly onto the ground so that the dead load weight and volume of food within the feeder is borne by the ground itself as the foods' solitary vertical support.

\* \* \* \* \*